(12) United States Patent
Hackius et al.

(10) Patent No.: US 8,039,115 B2
(45) Date of Patent: Oct. 18, 2011

(54) METALLIC AIRCRAFT COMPONENT

(75) Inventors: Jens Hackius, Bremen (DE); Dirk Dittrich, Dresden (DE); Bernd Winderlich, Dresden (DE); Berndt Brenner, Dresden (DE); Jens Standfuss, Dresden (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 203 days.

(21) Appl. No.: 11/856,789

(22) Filed: Sep. 18, 2007

(65) Prior Publication Data
US 2009/0134275 A1 May 28, 2009

(30) Foreign Application Priority Data
Sep. 19, 2006 (DE) .......... 10 2006 046 080

(51) Int. Cl.
*B64C 1/00* (2006.01)
(52) U.S. Cl. ......... 428/615; 428/600; 428/636; 244/119
(58) Field of Classification Search ........................ None
See application file for complete search history.

(56) References Cited

U.S. PATENT DOCUMENTS 1,773,068 A * 8/1930 Vienneau ...................... 219/105
5,505,365 A * 4/1996 Olsen ............................ 228/135
6,048,628 A * 4/2000 Hillmann et al. ............. 428/594

FOREIGN PATENT DOCUMENTS
AT            169919 B       12/1951

OTHER PUBLICATIONS

German Office Action for International Application DE102006046080.4.
German Office Action for International Application DE102006046080.4 Apr. 2007.

* cited by examiner

*Primary Examiner* — Jennifer McNeil
*Assistant Examiner* — Adam Krupicka
(74) *Attorney, Agent, or Firm* — Matthew B. Dernier, Esq.; Gibson & Dernier, LLP (57) ABSTRACT

The invention relates to metallic aircraft components which can preferably be used for aircraft structures in the fuselage region. A damage-tolerant design is usual for aircraft components in the fuselage region. It is the object of the invention to provide metallic components in which metal sheets are connected to one another by weld seams which have an improved damage tolerance behavior and fatigue crack propagation behavior. In an aircraft component in accordance with the invention, at least two metal sheets are welded to one another as butt joints. The centerline of the join line of the weld seam is predetermined by the outer edge contour of the metal sheets connected to one another. In this connection, it is formed deviant from a continuously straight line shape such that the total length of the weld seam is increased by changes in direction periodically occurring at the edge contours engaging into one another in a complementary manner.

16 Claims, 12 Drawing Sheets

METALLIC AIRCRAFT COMPONENT

The invention relates to metallic aircraft components which can preferably be used for aircraft structures in the fuselage region. A damage-tolerant design is required for aircraft components in the fuselage region. It is customary to allow damage tolerance in aircraft components. This means that cracks formed as a consequence of strains can be tolerated up to a specific length in aircraft components. A crack length may not exceed a critical value at least up to the next inspection in this connection.

It is customary in this context with respect to such lightweight design structures in which pressure differences can occur between the inside and the outside to manufacture them in cylindrical construction. Skin segments are connected to one another for this purpose. They then comprise an aluminum sheet metal skin which is stiffened in the longitudinal and transverse directions by stiffening sections (stringers, joists, clips). The skin segments are connected using a plurality rivets in butt joint manner by overlapping doubler sheets. However, a high production effort and/or cost and an increase in the mass thereby result.

The attempt was therefore made in the past to use different joining technologies and here in particular welding. However, the special demands for low-defect connections in aircraft construction have previously stood in the way of this. In this connection, the changes in the material properties due to the thermal welding process have a negative effect. This results in a reduced static and dynamic strength. The fatigue crack formation occurs faster and the propagation of cracks is unfavorable since they frequently extend along a weld seam in the negatively affected material of the joining zone and become longer more easily and faster in this context than in the thermally unaffected base material. The cracks extending in the weld seam cannot leave said weld seam in the direction of the base material. The crack progression speed in a weld seam is consequently much larger than in the base material for the reasons explained above.

The favorable material properties of the aluminum alloys usually used are negatively influenced by the welding and the use of alloyed weld additives can also only have a limited positive effect on the structure in the region of the weld seam with its cast-like structure.

This is also the case in laser beam welding although less heat is input in this connection than in other welding processes. Laser beam welded butt joint connections, however, only reach 70 to 80% of the static strength in comparison with the unaffected base material in this connection.

Fatigue cracks which occur should, however, have a crack progression speed such that when a crack starts under a broken stiffened portion, the designated service life is still achieved. This is given in rivet connections since a crack forms in the base material, propagates there and additionally present stiffening elements can become effective as crack stoppers or crack inhibitors. This is, however, not the case with weld connections.

As is known, the crack propagation can be prevented, or at least hindered, in that a bore is formed at a tip of a crack. Such a measure can, however, only be carried out after recognition of the crack. A drastic shortening of the inspection intervals would be required for cracks propagating fast in a weld seam in an aircraft, which has the consequence of increased costs and an unjustifiable safety risk.

It is known from DE 100 09 305 A1 to use crack stop bandages on pipes under high internal pressure. However, this again increases the production effort and/or cost and also the mass. Such a technical solution cannot be used in aircraft construction in the described embodiment for reasons of weight and aerodynamics.

It is therefore the object of the invention to provide metallic components in which metal sheets are connected to one another by weld seams which have an improved damage tolerance behavior and fatigue crack propagation behavior.

This object is solved in accordance with the invention by a component having the features of claim 1. Advantageous embodiments and further developments of the invention can be achieved with features designated in subordinate claims.

With an aircraft component in accordance with the invention, at least two metal sheets are connected by means of a weld seam in a butt joint manner. The metal sheets connected to one another have an edge contour which predetermines the join line of the weld seam. The edge contour of the metal sheets connected to one another has a shape which deviates from a continuously straight line so that the total length of the weld seam is increased. In this context, it is therefore longer than actually required. In addition, periodic changes of direction are present at the edge contour of the metal sheets and the edge contours are formed at the metal sheets such that they engage one another in a complementary manner. The edges of the metal sheets contact one another directly in the weld seam region. Such a design of the weld seam is not caused, or is at least not only caused, by construction aspects over at least fairly large regions in order to connect the metal sheets for the manufacture of a component with a predetermined geometry to one another.

Wave-shaped, sinusoidal, meander-like, arcuate or sawtooth-like edge contours, edge contours comprising segments extending alternately in curved and straight-line form or trapezoidal edge contours can be formed. In this connection, different edge contours taking account of respective local strain can also be formed at a weld seam.

The thickness of the metal sheets can advantageously be increased in the region of the edge contour. This can be achieved by means of a region called a skin field base. The increased sheet thickness should be observed with a width around the line of symmetry of the join line in the range between 2.4*A and 5*A. Here, A is the amplitude and corresponds to the maximum spacing of the edge contour and accordingly also of the join line from the line of symmetry of the join line. The amplitude should amount to at least 5 mm, preferably at least 10 mm. The width of the weld seam formed also has an effect on the respectively required and favorable amplitude and wavelength of the period. They can be selected to be smaller with narrow weld seams than with wider weld seams.

It is particularly advantageous to form skin field bases which are likewise contoured at metal sheets to be connected. The edge of such skin field bases facing away from the weld seam can thus have the same edge contour as the metal sheets to be connected to one another. The width of these skin field bases can thus be constant along the weld seam. The damage tolerance can be increased and the required component mass can simultaneously be upwardly limited by such a design of skin field bases.

The increase in the metal sheet thickness can, however, also be provided such that it increases continuously in the direction of the outer edge of the edge contour.

The line of symmetry of the oscillating shape of the join line can extend both in a straight line and with an arcuate curvature.

The periodically formed edge contour should have a wavelength $\lambda$ which lies in the range of $0.1 \leq A/\lambda \leq 2$.

The join zone formed at the weld seam should have a width $b_{F2}$ (width of the join zone) in the range from 2 to 10 mm. In this context, a join zone should be understood as the region of the weld zone with a heat influence zone adjacent to it at both sides.

One or more doubler elements can also be connected to the component, preferably by means of an adhesive bond, in a firmly bonded manner in the region of the welding seam for stiffening. Doubler elements can be formed from the sheet metal material, from fiber reinforced composite materials or from other metallic materials (e.g. titanium).

A doubler element can have a width in the range 2.4*A to 6*A and can therefore completely cover the whole width of the curved weld seam.

Trapezoidal, meander-like or sawtooth-like edge contours should not have any sharp corners or edges. Regions in which changes in direction of 90° and more should occur should have correspondingly larger transition radii. Trapezoidal edge contours be made in normal geometry or also similar to "dovetail connections".

In a design with an increased sheet thickness or skin sheet base in the weld seam region, the damage tolerance can be further improved. This is possible with a reduction in the strain at the crack tip.

An increased sheet thickness effects a reduction in the strain at the crack tip with an equal outer stress.

Edge contours, and accordingly also a join line, at components in accordance with the invention can also not have any constant wavelength and/or amplitude along the formed weld seam. Regions can thus be provided at which the amplitude and/or wavelength is/are larger or smaller than at other regions.

The weld connection can be formed by laser beam welding, electron beam welding or also by friction stir welding. A weld connection formed as a butt joint connection is to be preferred.

When forming edge contours, a critical crack length $a_c$ specific to the component and/or the strain should be taken into account. In this context, the weld seam should be made such that changes in direction occur, with a path occurring within the join zone which extends in a straight line and is not longer than a maximum length $L_{max}$.

For instance $L_{max} < a_c/s$ should apply, where s is an improvement factor which should be larger than 1.2. The improvement factor corresponds to the degree of improvement in the damage tolerance with respect to a weld seam in the not thickened metal sheet which is made as a continuous straight line and with the same joining method.

The critical crack length $a_c$ in the direction of the fatigue crack propagation can be determined by $$a_c = a_{cGW} * (K_{cFz}/K_{cGW})^2$$

where $k_{cFz}$ is the critical stress intensity factor for the failure of the most unfavorable material state in the join zone for the given strain case; $K_{cGW}$ is the critical stress intensity factor for the base material of the metal sheets for the given strain case and $a_{cGW}$ is the critical crack length of the base material for a respective component geometry and a given strain case.

The already addressed increased thickness of the metal sheets in the region of the formed edge contours can also be achieved with a skin field base. It can be made in a width $b_{s1}$ (base width) in the range from 2.4 A to 5 A. It can be present symmetrically along the respective local shape of the join line.

In this connection, with a skin field base present at metal sheets and in analogy to $L_{max}$, a maximum straight line length $L_{smax}$ should be observed in which the following condition is satisfied:

$$L_{smax} < a_c * k/s.$$

The relationship $$k = m*[(h_s+t)t]^2 \text{ with}$$

$0.6 < m \leq 1$ as the base shape factor can be taken into account for the base factor k.

In this connection, $h_s$ corresponds to the base height and t to the respective metal sheet thickness.

A width $b_{s2}$ of a skin field base can, however also be determined by $$1.5 * b_{Fz} \leq b_{s2} \leq 10 b_{Fz}.$$

With the edge contours provided in accordance with the invention, a change in the direction vector take places with locally applied tangents at least once in half a period. With sinusoidal shapes or shapes in the form of an arc of a circle, such a change of a direction vector can occur at almost any point along an edge contour.

The damage tolerance can be improved, the crack progression speed can be reduced and, furthermore, a guiding of propagating cracks out of a weld seam can be achieved with the invention. A crack progression rate can thus be achieved which comes at least very close to that of the base material of the metal sheets.

With components in accordance with the invention, a fatigue crack can extend perpendicular to the direction of strain under a strain of the respective weld seam. The position at which a crack has been formed in a join zone is of no significance in this connection. It can therefore be formed either in the weld seam region or in the base material.

If a crack forms within the weld seam or the join zone, the crack first extends therein as a consequence of the reduced material resistance. The crack migrates due to a strain acting perpendicular to the crack propagation direction up to the end of the interface weld seam/thermal influence zone and is then forced to cross into the base material.

The invention should be explained in more detail by way of example in the following.

There are shown.

Possibilities for the forming of metal sheets 1 and 2 which are show connected to one another by a weld seam are shown in FIGS. 1 to 4.

In this context, the edges of the metal sheets 1 and 2 which are to be connected to one another are provided with a complementary edge contour 6 and 7. In the example in accordance with FIG. 1 and, a sinusoidal edge contour is thus formed and in the example in accordance with FIGS. 3 and 4 a sawtooth-shape edge contour.

Figure 1:
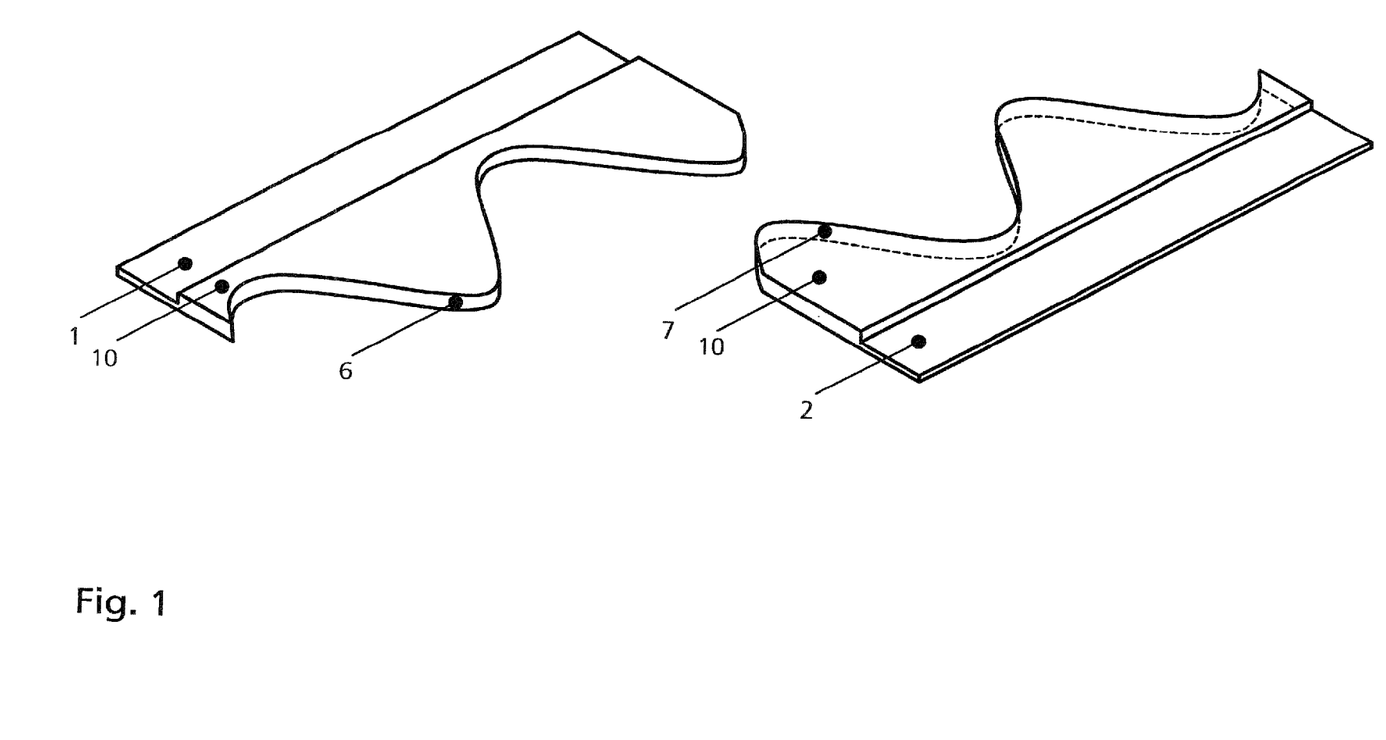
FIG. 1 two sections of metal sheets to be combined with one another.
Figure 1A:
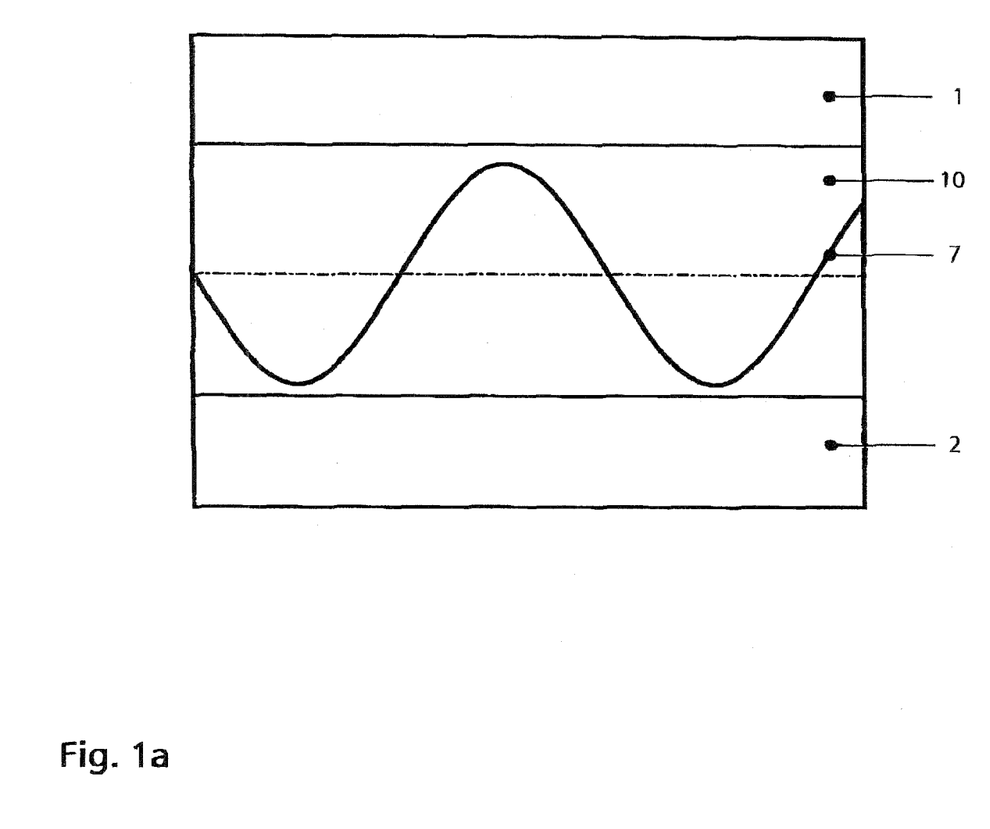
FIG. 1a the sections to be connected to one another in accordance with FIG. 1 in a view from above.
Figure 2:
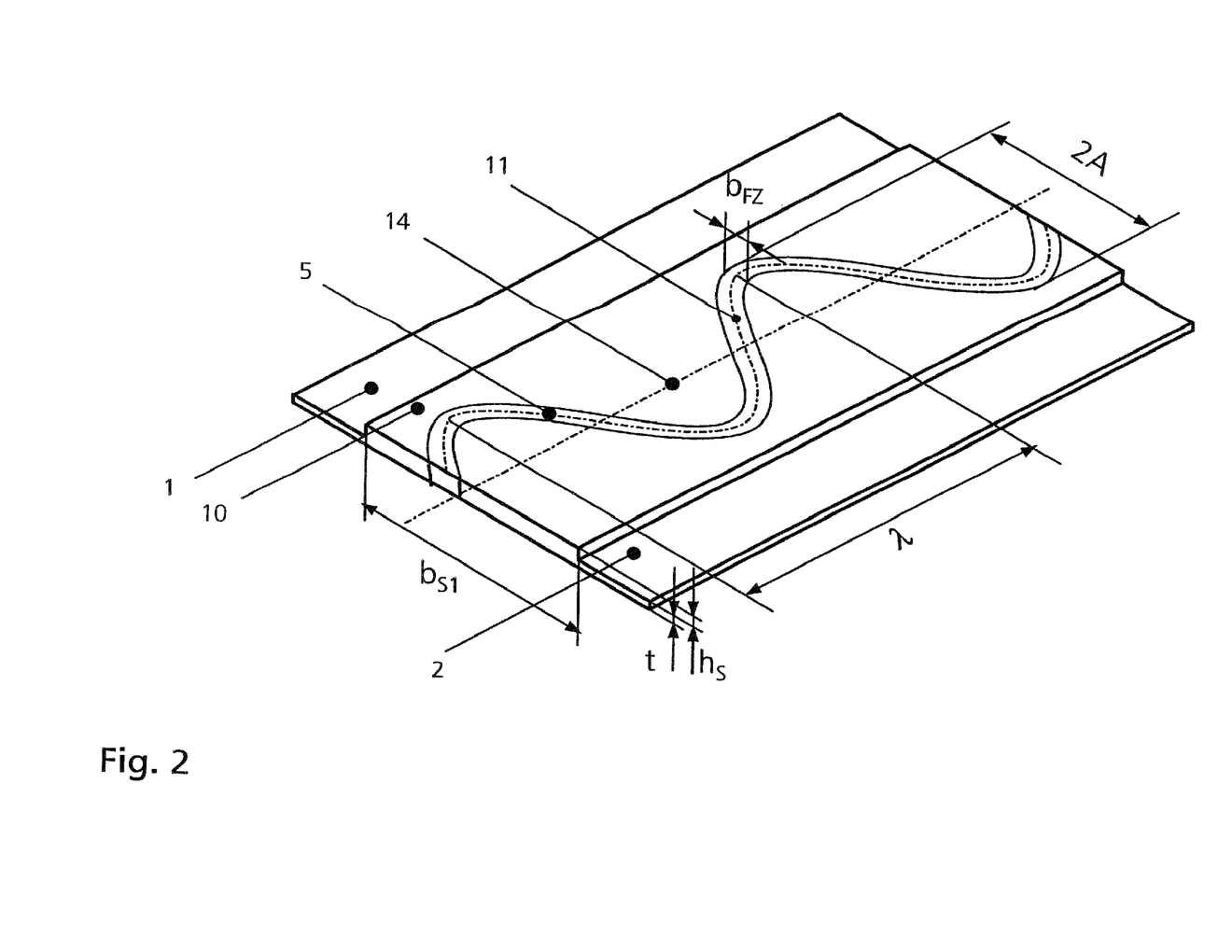
FIG. 2 a part of an example of a component in accordance with the invention.
Figure 3:
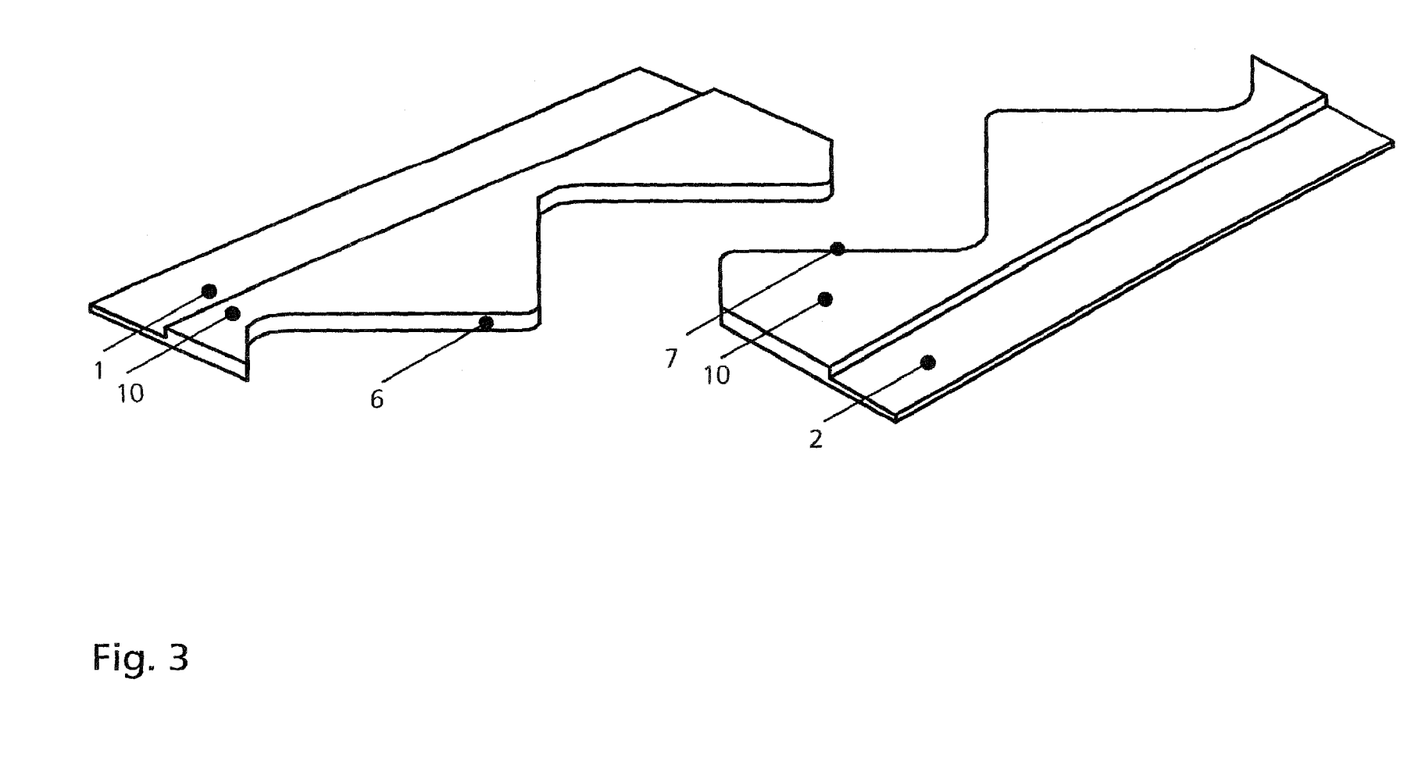
FIG. 3 two sections of metal sheets to be connected to one another.
Figure 3A:
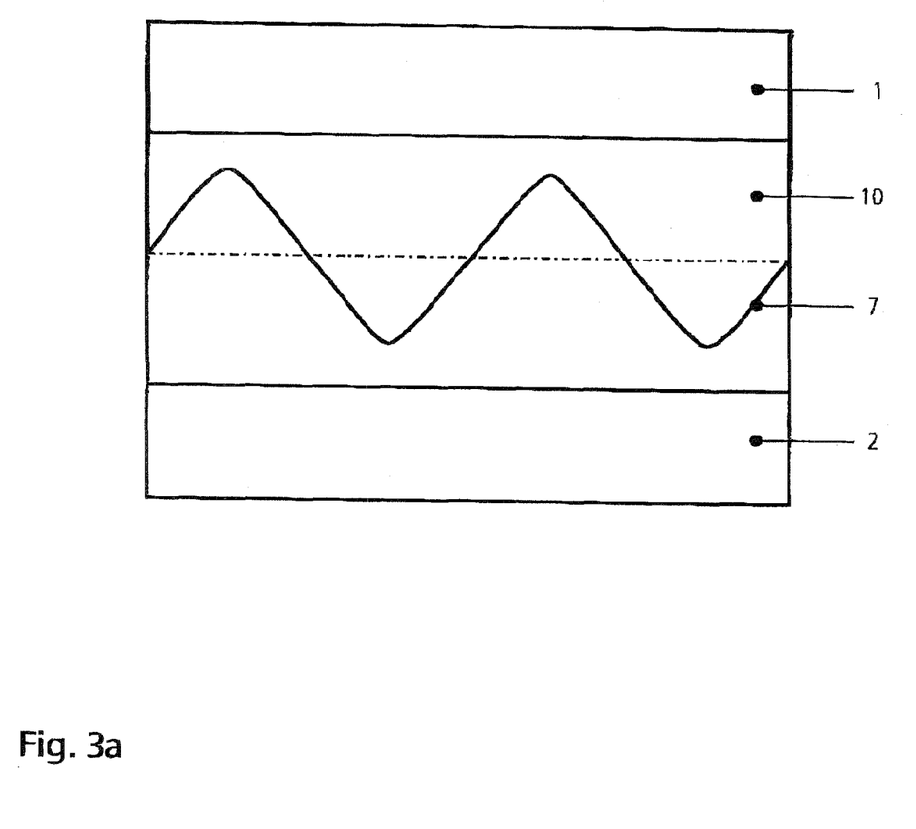
FIG. 3a the sections to be connected to one another in accordance with FIG. 3 in a view from above.
Figure 4:
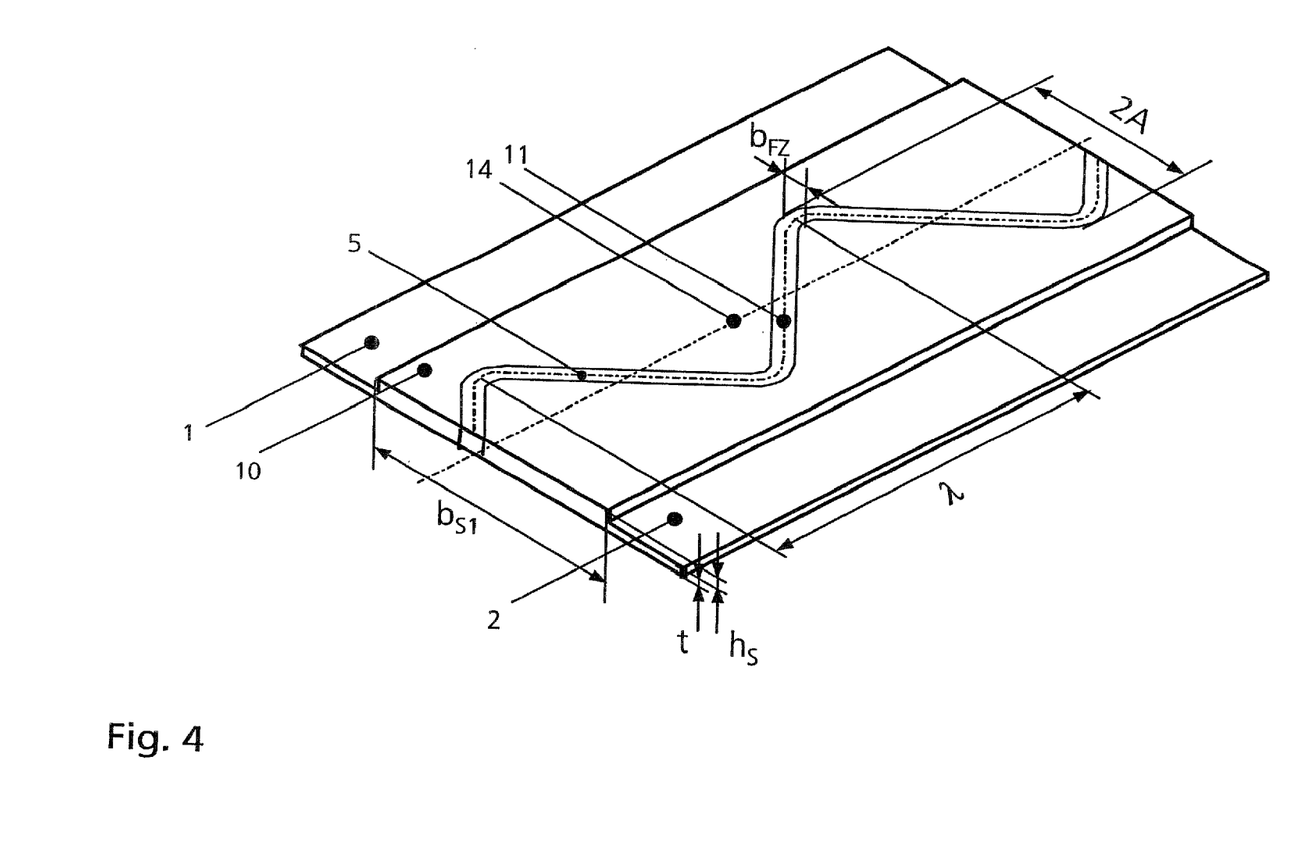
FIG. 4 a part of a further example of a component in accordance with the invention.
Figure 5:
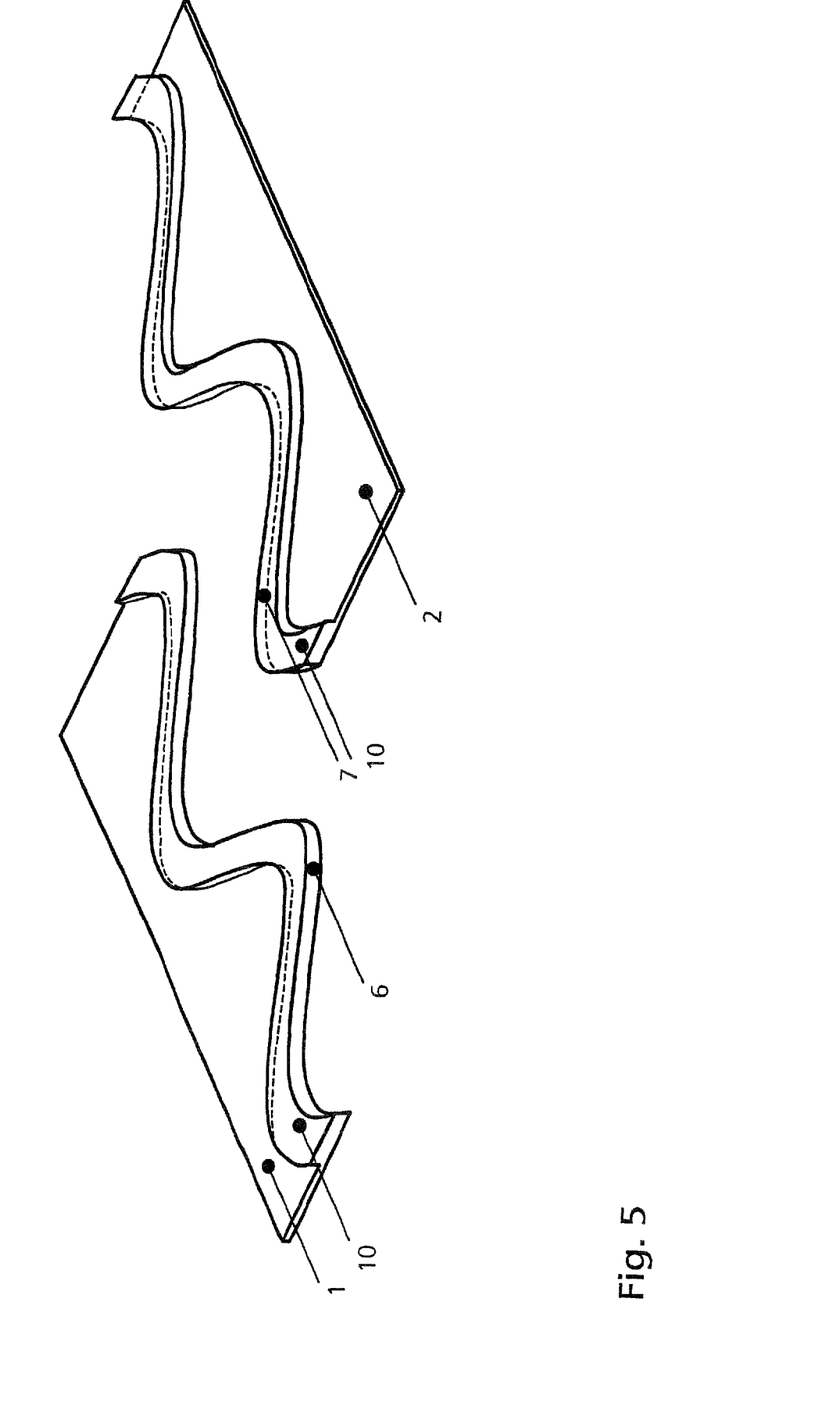
FIG. 5 two metal sheets to be welded to one another with a contoured skin field base.

This can be achieved by conventional machining such as milling or eroding. The respective edge shapes 6 and 7 are made in specular symmetry at the metal sheets 1 and 2 in this connection.

They are pushed into one another before the welding so that the outer edges of the two metal sheets 1 and 2 are brought into touching contact. The welding takes place as a butt joint and a centerline of the join line 11 results which follows the shape of the edge contours. The centerline of the join line 11 extends in this connection symmetrically with respect to its line of symmetry 14 which extends in a straight line in these examples In both examples, a skin field base 10 is present in the region of the weld seam having direction changes. It is dimensioned such that it not only has a larger thickness than the thickness of the metal sheets 1 and 2, but also has a width bs1 with respect to the line of symmetry 14 of the centerline of the join line 11 which is larger than twice the amplitude A.

Figure 7:
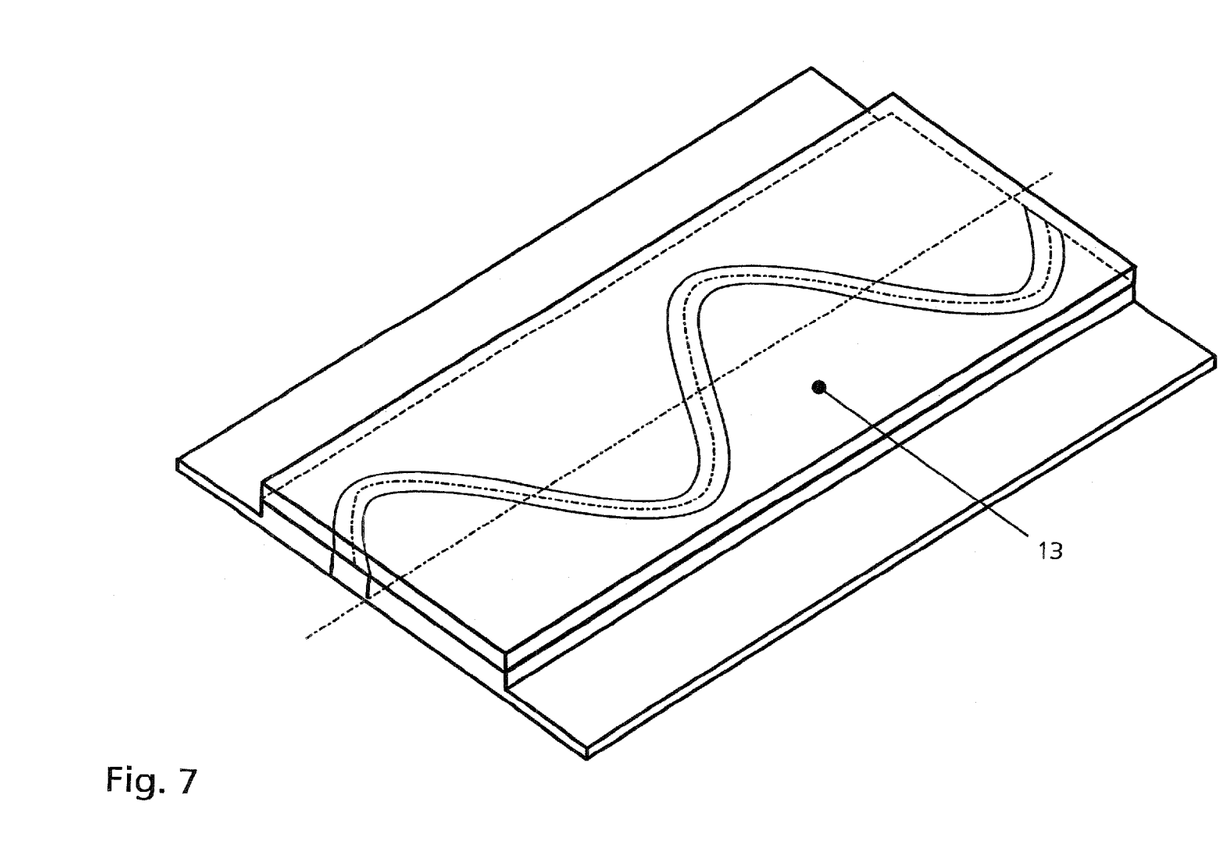
FIG. 7 a component with an adhesively bonded doubler element.

In an analog form, a doubler element 13 could be adhered, alone or additionally instead of the skin field base 10, on the metal sheets connected to one another at the same position and with at least a similar dimensioning, as is shown in FIG. 7.

Figure 8:
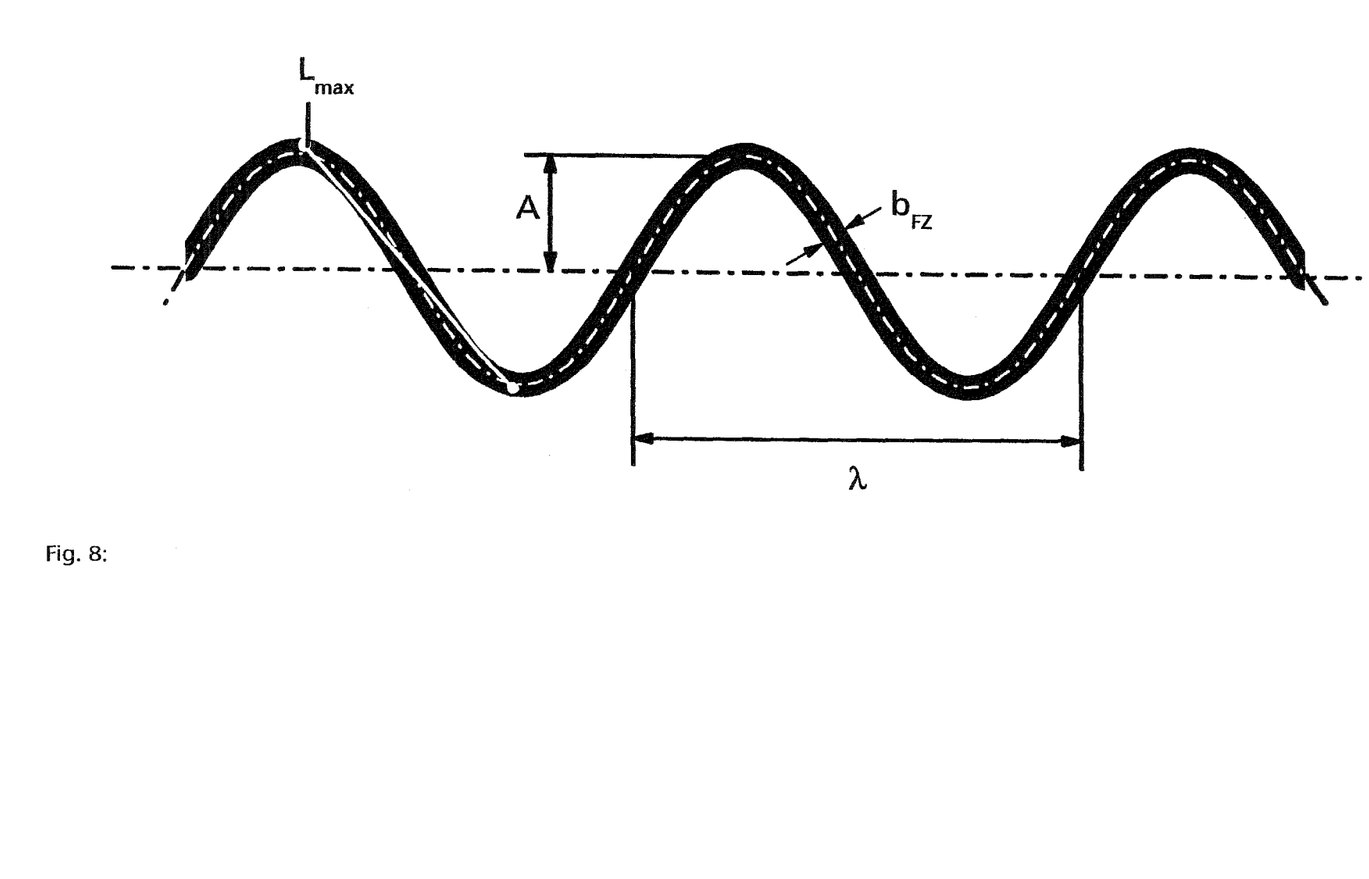
FIG. 8 a sinusoidal weld seam with an illustrated maximum permissible straight line path $L_{max}$.

FIG. 8 should illustrate how a path extending in a straight line with the maximum permitted length $L_{max}$ and optionally and analog also $L_{smax}$ should also be taken into account with curved shapes of centerlines of a join line 11. A sinusoidal shape is shown here, for instance. The path with a length $L_{max}$ lies within the join zone 5 here and is thus also codetermined by the respective width of the join zone 5 in addition to the amplitude and the wavelength.

Figure 6:
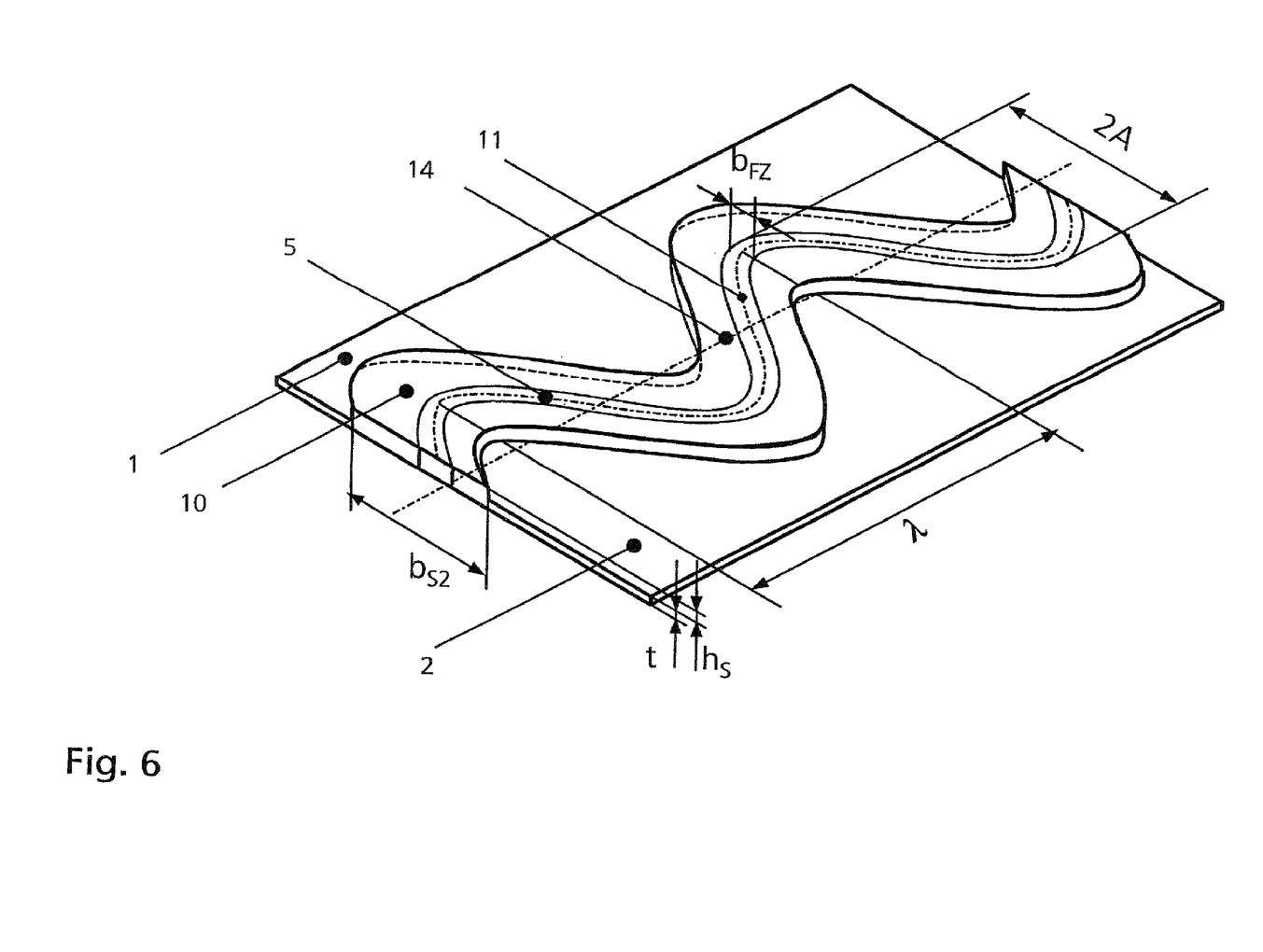
FIG. 6 a part of the components manufactured using the metal sheets in accordance with FIG. 5.

The example shown with FIGS. 6 and 7 is formed with a contoured skin field base 10 at the metal sheets 1 and 2. The geometry of the skin field base 10 in this connection corresponds to the geometry of the edge contour 6 and 7 of the respective metal sheet 1 and 2. The crack propagation speed of a crack in the join zone 5 can thus be reduced and the mass growth of the component can be limited to a very large extent.

The manufacture of metallic components in accordance with the invention should now be explained further with the following embodiments.

EXAMPLE 1

Two metal sheets 1 and 2 of a weldable Al—Mg—Si alloy having a thickness t of 5.0 mm should be connected to one another by laser beam welding such that the crack propagation speed is much lower with cyclic strain than with a laser beam weld seam and not substantially higher than that of the unwelded base material.

The edges to be welded to one another of the two metal sheets 1 and 2 have periodic edge contours 6 and 7 which are shaped like an arc of a circle and which engage into one another in a complementary manner. In this connection, the arcs each form a semi-circle with a radius r of 20 mm. This produces an amplitude A=20 mm and the wavelength $\lambda$=80 mm.

The metal sheets 1 and 2 provided with the edge contours 6 and 7 are placed next to one another in butt joints and are welded. The welding takes place by means of a laser power of 6.0 k and a weld speed of 3 m/min. A wire having a diameter of 0.8 mm of an Al—Si alloy is used as a weld additive at a wire conveying speed of 6 m/min to avoid the formation of hot cracks. Helium is used as the inert gas.

With these welding parameters, a cleanly formed weld seam is produced without seam defects. The width $b_{F2}$ of the join zone 5 amounts to 6 mm. $0.1 \leq A/\lambda = 0.25 \leq 2$; $2 \text{ mm} < b_{Fz} = 6 \text{ mm} \leq 10 \text{ mm}$ thus applies.

Figure 9:
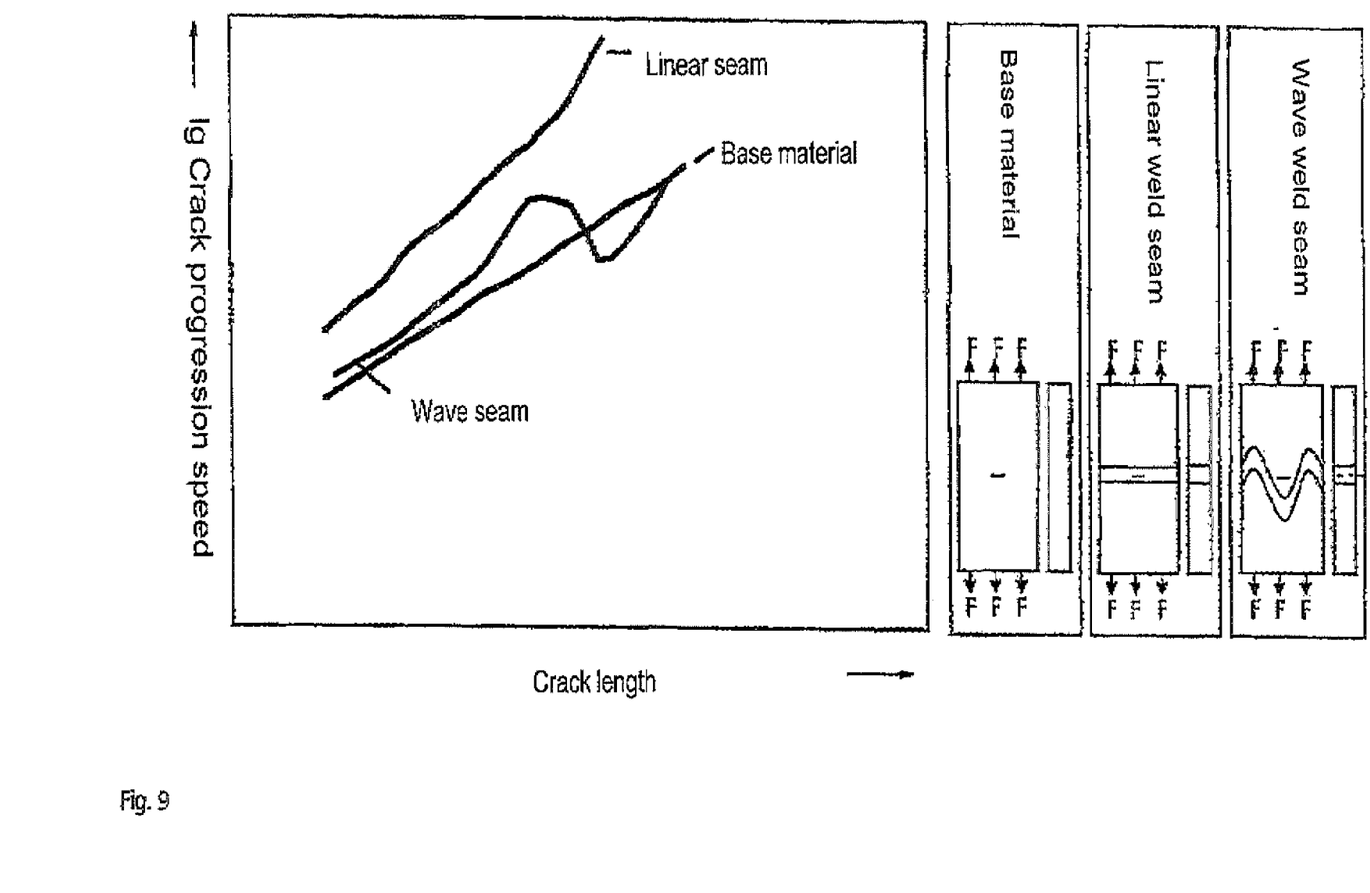
FIG. 9 a diagram showing the crack propagation speed in dependence on the crack length reached for a component in accordance with the invention in accordance with Example 1 and a conventionally welded component.

A component joined in this manner having the dimensions 500 mm×200 mm is exposed in swelling form to a cyclic skin tension of 90 MPa at a frequency of 5 to 8 Hz to determine the crack propagation speed. Starting from a mechanically introduced start indent of the starting length $2a$=3 mm, the component is swung up to the formation of a fatigue crack. The crack progression speed da/dN (crack progression per swing cycle) which is produced from a crack length a=15 mm is shown in FIG. 9 in semi-logarithmic presentation in dependence on the crack length. This dependence is compared with that of the unwelded sample or the sample welded conventionally with a straight line. A sample with a linear seam shape has a crack progression rate with a respective crack length which is 2 to 8 times higher than that of the unwelded sample. If the starting crack is produced in the base material in the component with the seam shape in the form of an arc of a circle in accordance with the invention, it propagates at only a slightly larger crack propagation speed than with the unwelded sample. When approaching the join zone 5, the crack propagation speed increases up to the crossing of the join zone 5 to then drop below that of the unwelded sample. Finally, it again approaches the shape of the unwelded sample from below. If the start crack is, in contrast, in the join zone 5, the initial crack propagation speed is larger than with the unwelded sample, but then also falls below its value earlier. It is thus shown that a decisive improvement in the crack propagation speed of welded components is thus possible with the seam shape in accordance with the invention.

EXAMPLE 2

The skins of a lower rump of an aircraft should be connected to one another by laser beam welding. The component must be adapted to be damage tolerant, a straight line weld seam shape is associated with a considerable increase in the crack propagation speed in accordance with the results in FIG. 9 and is therefore not acceptable. The metal sheets 1 and 2 had a thickness t of 2 mm and are manufactured from the same Al—Mg—Si material as in Example 1.

The metal sheets 1 and 2 to be welded to one another have a skin field base 10 of a width $b_{s1}$ of 60 mm and a height $h_s$ of 3 mm. Furthermore, they likewise show an edge contour 6 and 7 shaped periodically as an arc of a circle and engaging into one another in a complementary manner. The arcs in this connection each form a semi-circle having a radius r of 20 mm. This sets an amplitude A=20 mm and the wavelength $\lambda$=80 mm.

Figure 10:
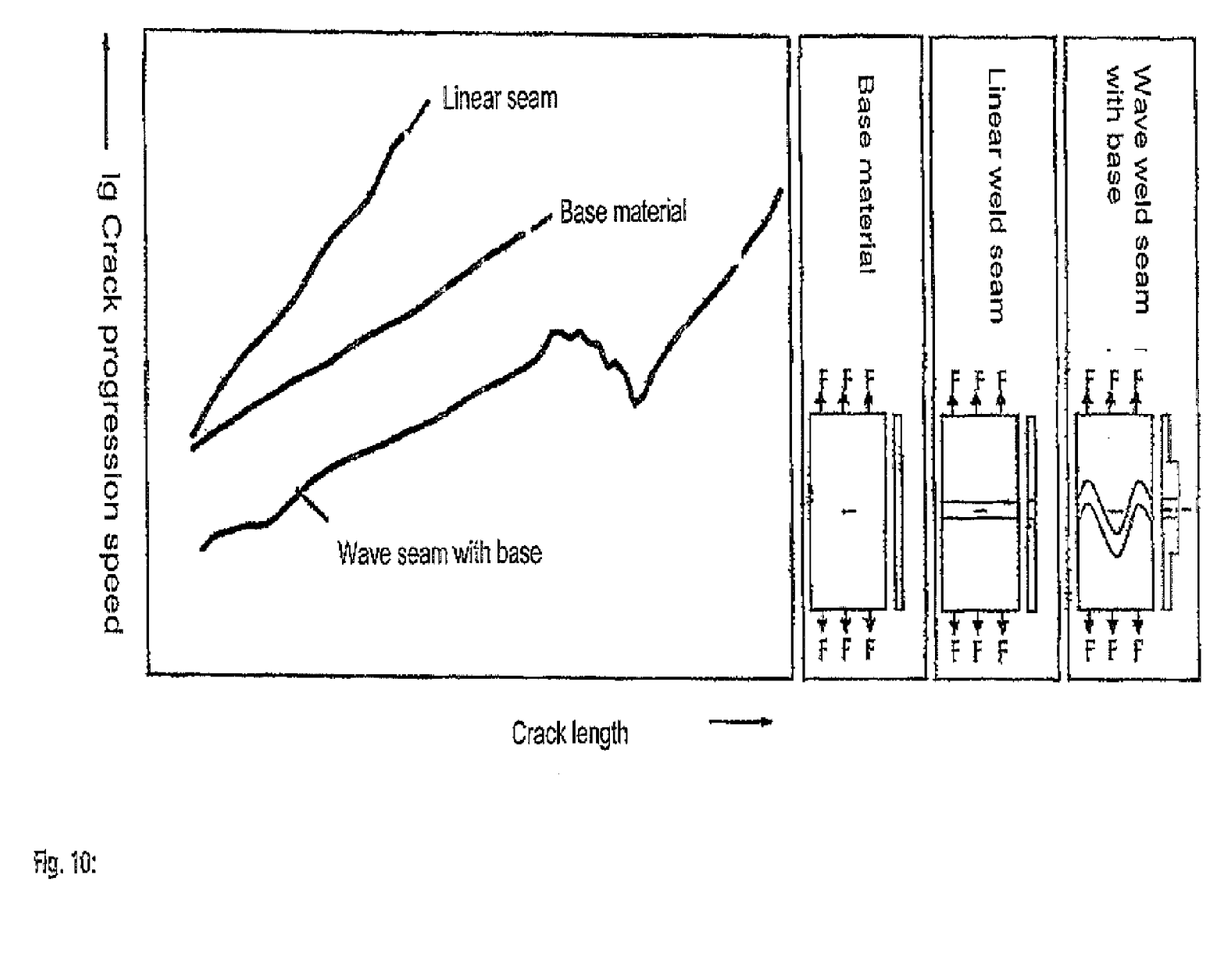
FIG. 10 a diagram showing the crack propagation speed in dependence on the reached crack length for a component in accordance with the invention in accordance with Example 2 and a conventionally welded component.

The two skins provided with edge contours 6 and 7 and skin field base 10 are joined and tested using the same weld parameters, strain state and the same skin tension as in Example 1. As shown in FIG. 10, it becomes possible with the weld seam in the shape of an arc of a circle and the skin field base 10 to reduce the crack propagation speed by the factor 2 to 4 with respect to the unwelded state and by the factor 3 to 15 with respect to the linear seam without skin field base 10. It furthermore has an advantageous effect that the weight increase due to the skin field base 10 is lower than in a conventional riveted variant.

The invention claimed is:

1. A metallic aircraft component, comprising:
   at least two metal sheets are connected to one another by means of a weld seam made as a butt joint, wherein a centerline of a join line of the weld seam is predetermined by an outer edge contour of the metal sheets connected to one another at respective edge contours and, deviating from a continuously straight line shape, wherein changes in direction increasing a total length of the weld seam are provided periodically at the two edge contours of the metal sheets engaging into one another in complementary manner wherein a periodically formed edge contour with amplitude A has a wavelength λ in the range of $0.1 \leq A/\lambda \leq 2$ and the weld seam is formed such that, changes in direction of the weld seam within a join zone, occur in a manner that a path extending in a straight line across the join zone has a length Lmax which is smaller than a quotient of a critical crack length $a_c$ specific to the component and an improvement factor, s that corresponds to a degree of improvement in damage tolerance of the weld seam as compared to damage tolerance of a continuous straight line weld seam formed when the two metal sheets are welded together in the continuous straight line weld seam with a same joining method as the weld seam.

2. A component in accordance with claim 1, wherein the edge contour of the metal sheets is shaped as one or more of a wave, sawtooth curved at vertices, meander, arcuate, trapezoidal comprising segments extending alternately in curved and straight-line form.

3. A component in accordance with claim 1, wherein a metal sheet thickness of the metal sheets is increased in the region of the edge contour.

4. A component in accordance with claim 3, wherein the metal sheet thickness is increased around the centerline of the join line to a width bs1 of $2.4*A \leq bs1 \leq 5*A$ wherein A is the amplitude of a periodic shape formed by the edge contours.

5. A component in accordance with claim 3, wherein a metal sheet thickness of each of the two metal sheets is gradually increased from an edge distal to the weld seam in a direction towards respective edge contours of the two metal sheets.

6. A component in accordance with claim 3, wherein the increased thickness is achieved with a skin field base.

7. A component in accordance with claim 1, wherein a skin field base is formed with a geometrical design at each of the metal sheets matched to the edge contour of the metal sheets.

8. A component in accordance with claim 7, wherein the skin field base has a constant width bs2 at the respective metal sheet of each of the two sheets.

9. A component in accordance with claim 1, wherein when a skin field base is present, Lmax is smaller than a quotient of a product of a critical crack length $a_c$ specific to the component with a base factor k and the improvement factor, s, wherein $k \leq m*[(h_s+t)t^2)$ with $0.6 < m \leq 1$, $h_s$ corresponds to a height of a skin field base, t is thickness of the metal sheets.

10. A component in accordance with claim 1, wherein the periodically formed edge contour has an amplitude $A \geq 5$ mm with respect to a line of symmetry of a centerline of the join line.

11. A component in accordance with claim 1, wherein the weld seam is made with a join zone having a width $b_{Fz}$ in the range from 2 to 10 mm.

12. A component in accordance with claim 1, wherein a line of symmetry of a centerline of the join line has a shape deviating from a straight line at least regionally.

13. A component according to claim 1, wherein the critical crack length $a_c$ in a direction of fatigue crack propagation can be determined by $$a_c = a_{cGW}*(K_{cFz}/K_{cGW})^2$$

where $k_{cFz}$ is critical stress intensity factor for failure of a most unfavorable material state in a join zone for a given strain case; $K_{cGW}$ is a critical stress intensity factor for a base material of the metal sheets for the given strain case and $a_{cGW}$ is a critical crack length of a base material for a respective component geometry and the given strain case.

14. A component in accordance with claim 1, wherein the improvement factor s is larger than 1.2.

15. A metallic aircraft component comprising:
   at least two metal sheets connected to one another by a weld seam made as a butt joint, wherein a centerline of a join line of the weld seam is predetermined by an outer edge contour of the metal sheets connected to one another at respective edge contours and, deviating from a continuously straight line shape so that changes in direction increasing a total length of the weld seam are provided periodically at the two edge contours of the metal sheets engaging into one another in complementary manner and the weld seam is formed such that changes in direction of the weld seam within a join zone, occur in a manner that a path extending in a straight line across the join zone has a length Lmax which is smaller than a quotient of a critical crack length $a_c$ specific to the component and an improvement factor, s that corresponds to a degree of improvement in damage tolerance of the weld seam as compared to damage tolerance of a continuous straight line weld seam formed when the two metal sheets are welded together in the continuous straight line weld seam with a same joining method as the weld seam; and
   a doubler element connected in a firmly bonded manner to the metal sheets for reinforcement in the region of the weld seam and a width of the doubler element is in a range of $2.4*A$ to $6*A$ wherein A is an amplitude of a periodic shape formed by the edge contours.

16. A metallic aircraft component comprising:
   at least two metal sheets connected to one another by a weld seam made as a butt joint, wherein a centerline of a join line of the weld seam is predetermined by an outer edge contour of the metal sheets connected to one another at respective edge contours and, deviating from a continuously straight line shape, so that changes in direction increasing a total length of the weld seam are provided periodically at the two edge contours of the metal sheets engaging one another in a complementary manner and the weld seam is formed such that changes in direction of the weld seam within a join zone, occur in a manner that a path extending in a straight line across the join zone has a length Lmax which is smaller than a quotient of a critical crack length $a_c$ specific to the component and an improvement factor, s that corresponds to a degree of improvement in damage tolerance of the weld seam as compared to damage tolerance of a continuous straight line weld seam formed when the two metal sheets are welded together in the continuous straight line weld seam with a same joining method as the weld seam and one or more of an amplitude A and a wavelength $\lambda$ of a periodically shaped edge contour is varied along a line of symmetry of a centerline of the join line.

* * * * *